United States Patent Office 3,338,970
Patented Aug. 29, 1967

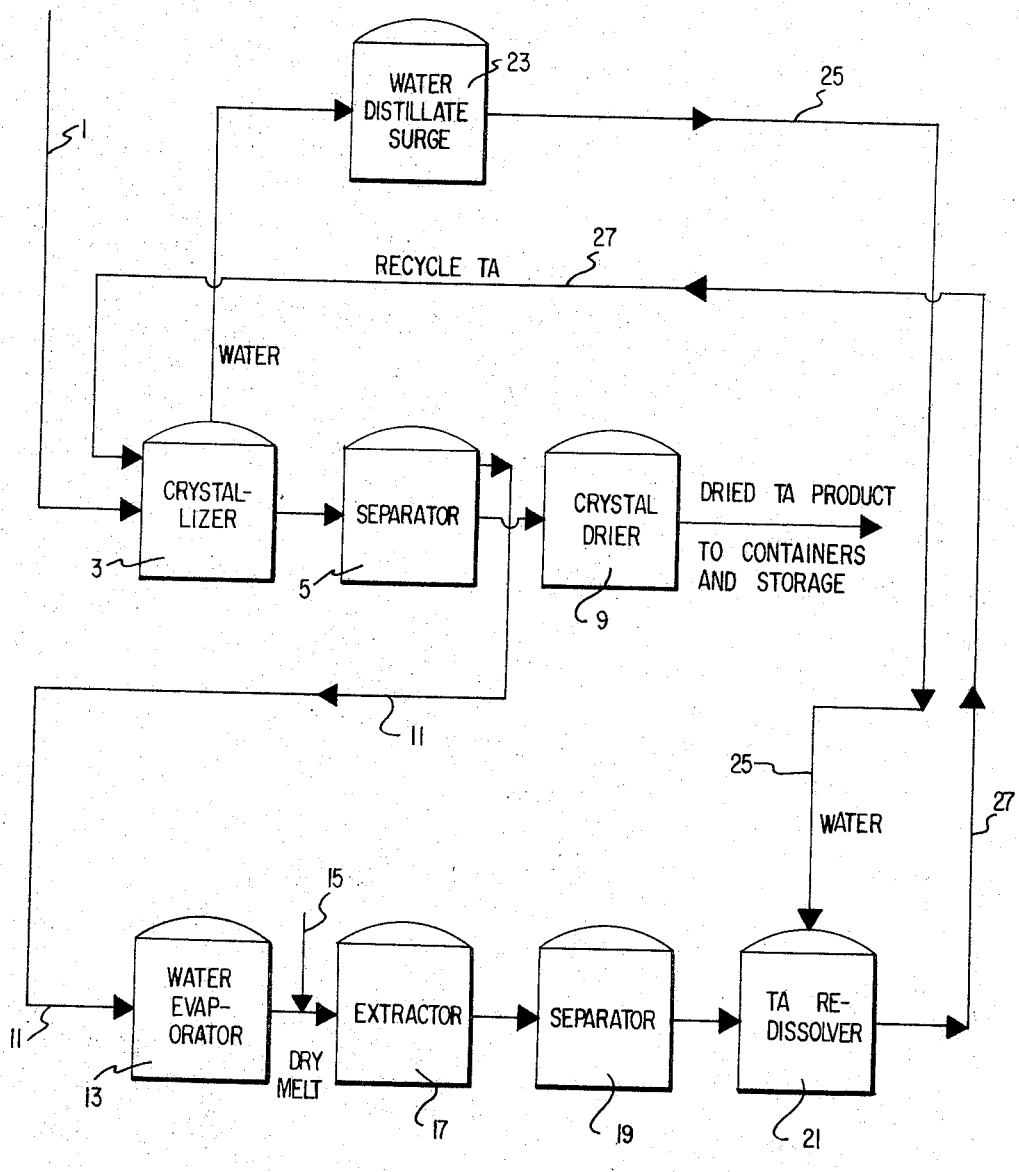

3,338,970
PROCESS FOR THE PRODUCTION OF TRIS (HYDROXYMETHYL) AMINOMETHANE CRYSTALS
Fred W. Schmitz and John B. Tindall, Terre Haute, Ind., assignors to Commercial Solvents Corporation, a corporation of Maryland
Filed Mar. 2, 1964, Ser. No. 348,401
7 Claims. (Cl. 260—584)

This invention is directed to a process for the production of tris(hydroxymethyl)aminomethane crystals of relatively uniform crystal shape, size and purity, and in high yields.

In accordance with the process of the present invention, it has been surprisingly found that a tris(hydroxymethyl) aminomethane (TA) crystalline product of a single grade and having crystals which are relatively uniform as to shape, size and purity can be produced in high yields, e.g. better than about 95%, while at the same time producing the product efficiently and with low operating costs for large quantity production.

In the process of the present invention, a given concentrate, e.g. generally in the range of about 20 to 60 percent, but ordinarily about 30 to 50 percent by weight, of TA in aqueous solution having a molar ratio of impurity to TA generally of about 0.05 to 0.5:1 preferably less than about 0.25 to 1, is passed into a crystallizer to effect crystallization of TA and provide a slurry of TA crystals and mother liquor. Suitable crystallizers include crystallizers designed for a continuous evaporative crystallization or a combination of a separate evaporation followed by continuous or batch cooling type crystallization but the continuous evaporative crystallization is preferred. The crystals from the slurry are separated and recovered. The mother liquor from the separation is evaporated to provide a melt of TA which contains contaminating impurities. The melt is solvent extracted to remove contaminating impurities and precipitate solid TA which is dissolved in water and the resulting solution recycled to the crystallizer.

The invention is best exemplified by reference to the accompanying schematic drawing of the preferred continuous crystallization process.

An aqueous solution of TA, preferably a 40% concentrate, having a ratio of impurity to TA of about 0.25:1 (molar), is continuously fed through line 1 to evaporative crystallizer 3 which is operated under temperature and pressure conditions that continually evaporate water to a given water concentration that provides a saturated condition which results in crystallization of TA. Preferably the crystallization is conducted so as to crystallize about 50 to 90% by weight of TA present in the aqueous feed; although crystallizations recovering amounts below or above this range can be utilized if desired. When, for instance, a 40% concentrate of TA in aqueous solution is employed as the feed, a crystallizer temperature generally of about 40 to 190° F. under suitable pressure conditions (eq. about 0.2 to 12 inches of Hg), usually of about 130° or 140° to 160° F. and an evaporating absolute pressure of about 3 to 5 inches of Hg is preferably utilized. The concentration and temperature conditions used in the crystallizer are selected to obtain a saturated condition which results in the crystallization of the TA.

The crystallization effects the production of a slurry composed of solid crystals of TA and mother liquor. Under the preferred crystallization conditions aforementioned, the crystallization provides about 200 to 300 grams of crystals per liter of slurry and a mother liquor generally containing about 15 to 50%, e.g. preferably about 17 to 38%, by weight of water.

The water distillate from crystallizer 3 is conducted to water distillate surge 23. The slurry is continuously withdrawn from the crystallizer 3 and passed to a separator 5, which is preferably a centrifuge, wherein the TA crystals are separated from the mother liquor. The separated crystals are washed with cold water or methanol and dried in drier 9. Alternatively, the crystals can be removed from separator 5 and washed in a separate vessel. The dried finished product is then collected, put into containers and stored. The crystals are relatively uniform in shape, size and purity, having a purity, for instance, greater than about 99%.

The mother liquor resulting from the separation effected in separator 5 and genrally containing impurities, e.g. tris(hydroxymethyl)monomethylaminomethane, 2-amino-2-ethyl-1,3-propanediol; 2-amino-2-methyl - 1,3 - propanediol, ethanolamine but predominantly 2-amino-1,3-propanediol and 2-amino-2-methyl-1,3-propanediol, in a molar ratio to TA generally of about 0.1 to 1.2:1, usually of about 0.5 to 1.0:1 is sent by line 11 to water evaporator 13 where the water in the mother liquor is evaporated to a residual water content that provides a melt of TA with its contaminating impurities. Evaporation to a residual water content generally less than about 2.0%, e.g. 0.01 to 2.0%, by weight generally gives a satisfactory melt with evaporation to about 1% or less by weight water being preferred. Any effective evaporative conditions can be employed as, for instance, a temperature of 338° F. (170° C.) and a pressure of 50 mm. The resulting melt of TA (at a temperature of about 338° F. containing impurities is withdrawn from water evaporator 13, and is mixed, preferably at lower temperatures sufficient to crystallize the melt, with impurity extracting amounts of a solvent selected for the extraction of the impurities.

The types and amounts of impurities in the mother liquor primarily result from the process by which the TA is produced, for instance, by condensing a commercial grade of nitromethane with formaldehyde in the presence of sodium hydroxide catalyst and reducing the nitro product to the TA. In connection with the process of the present invention, it is important that the impurities be removed in order to maintain an efficient continuous operation wherein the TA in the mother liquor is not discarded but is recycled to the crystallizer for crystallization to enhance the amount of TA produced by the process. Unless the impurities are substantially removed, an impurity build-up will occur in the crystallizer thus varying the composition of the impurity content in the crystallizer during the course of operation of the process. This variance in content can have an undesirable effect on the crystal product produced, in that the product may also vary as to crystal shape, size and purity, thus resulting in a poor quality of product.

Another advantageous feature of the present invention resides in the surprising discovery that the impurity contained in TA melt can be efficiently and expeditiously separated by solvent extracting the impurity from the melt with a lower alkanol. Suitable alkanols which can be used include methanol, ethanol, normal propanol, isopropanol, butanol, the secondary, tertiary and isobutyl alcohols and the amyl alcohols. Butanol is preferred since in addition to being efficient for such solvent extraction, it can also be easily dehydrated for reuse to advantageously enhance the efficiency of the process. For instance, although methanol can be used, TA has a higher solubility in methanol than in butanol and this would result in a greater loss of TA. Although ethanol, normal propanol and isopropanol would have better low TA solubility characteristics than methanol, their dehydration for reuse would be more difficult than with butanol. The lower alkanol is used in amounts sufficient to solvent extract impurity from the TA melt and also provide a slurry of suitable handling properties. These amounts will ordinarily include an alkanol to TA melt weight ratio of about 0.5 to 2.1:1 and preferably equal amounts are used. Advantageously, the TA is contacted with the solvent at temperatures wherein the solvent is selective for the impurities over the amino compound.

Referring back to the illustration of the invention with reference to the drawing, butanol is provided by line 15 in a weight ratio of butanol to melt of 1:1 and the mixture is passed to extractor 17 which is maintained at a temperature under which the TA is insoluble in the butanol. The TA is precipitated as a solid and as the impurities are highly soluble in the butanol, they are readily extractable by the butanol. Generally the temperature used during solvent extraction will fall in the range of about 80 to 110° F.

The resulting slurry is pumped to a separator 19, such as, for instance, a filter or centrifuge which separates the solid TA from the filtrate of butanol and impurity. The separated solid TA crystals are passed to vessel 21 where they are redissolved with distillate water from water distillate surge 23 introduced into vessel 21 by means of line 25. Preferably, the amount of water used for the dissolution is that which privides a solution having a concentration of TA equal to approximately that of the original feed introduced in crystallizer 3. The resulting solution is then recycled via line 27 into crystallizer 3. Advantageously, the solution is first stripped free of residual butanol solvent by passing it to a stripping column (not shown) prior to recycle to crystallizer 3.

The impurity filtrate resulting from the separation in separator 19 is removed and is advantageously processed for the recovery of butanol for reuse in the butanol extraction step of the process.

Although the invention has been exemplified by the above description, it is intended to include other equivalents obvious to those versed in the art. For instance, instead of having, as shown in a preferred embodiment, the crystallizer in what can be termed a first stage and the impurity purge and TA recycle in the second stage, the reverse can be utilized. Alternatively, the aqueous solution of TA can be divided wherein one portion is conducted to the crystallizer and the other portion is subjected to the impurity purge utilizing the evaporation and solvent extraction procedures described supra. An additional alternative includes the substitution of a cooling type crystallizer for the evaporative type and even batch crystallization could feasibly be used in conjunction with the solvent extraction to provide the advantages of the present invention.

It is claimed:

1. A process for the production of tris(hydroxymethyl) aminomethane crystals of relatively high purity and in high yields which comprises crystallizing tris(hydroxymethyl)aminomethane from an aqueous solution of tris (hydroxymethyl)aminomethane in a crystallizer to effect crystallization and provide a slurry of tris(hydroxymethyl) aminomethane crystals and mother liquor, separating and recovering the crystals from said slurry, evaporating the mother liquor obtained from said separation to provide a melt of tris(hydroxymethyl)aminomethane, and solvent extracting the melt with a lower alkanol to remove impurities from the melt and precipitate tris(hydroxymethyl)aminomethane.

2. The process of claim 1 wherein the crystallizer is a continuous evaporative crystallizer.

3. The process of claim 2 wherein the aqueous solution of tris(hydroxymethyl)aminomethane is passed into the crystallizer at a given concentration in the range of about 20 to 60 percent by weight and the tris(hydroxymethyl)aminomethane precipitated with the lower alkanol is recycled to the crystallizer.

4. The process of claim 3 wherein the lower alkanol is butanol.

5. A continuous process for the production of tris(hydroxymethyl)aminomethane crystals in high yields, of high purity and of relatively uniform shape, size and purity which comprises continually passing an aqueous solution of tris(hydroxymethyl)aminomethane having a given concentration in the range of 20 to 60 percent into an evaporative crystallizer to effect crystallization of about 50 to 90% by weight of the tris(hydroxymethyl)aminomethane present in said aqueous solution and provide a slurry of tris(hydroxymethyl)aminomethane crystals and mother liquor, separating and recovering the crystals from the slurry, evaporating the mother liquor obtained from the separation to provide a melt of tris(hydroxymethyl)aminomethane containing impurities, said melt having a residual water content of up to about 2%, extracting the melt with butanol at a temperature of about 80 to 110° F. using a butanol to melt weight ratio of about 0.5 to 2.0:1 to remove contaminating impurities and precipitate solid tris(hydroxymethyl)aminomethane, separating and dissolving the solid tris(hydroxymethyl) aminomethane in water, stripping the resulting solution of tris(hydroxymethyl)aminomethane of residual butanol, dissolving the solid tris(hydroxymethyl)aminomethane in water and recycling the resulting aqueous solution to the evaporative crystallizer.

6. A continuous process for the production of tris(hydroxymethyl)aminomethane crystals in high yields, of high purity and of relatively uniform shape, size and purity which comprises passing an aqueous solution of 30 to 50 percent by weight tris(hydroxymethyl)aminomethane into an evaporative crystallizer operated at a temperature of about 130 to 160° F. to effect crystallization of tris(hydroxymethyl)aminomethane and provide a slurry of tris(hydroxymethyl)aminomethane and mother liquor, separating and recovering the crystals from the slurry, evaporating the mother liquor from the separation to provide a melt of tris(hydroxymethyl)aminomethane containing impurities, said melt having a residual water content of up to about 1%, extracting the melt with a substantially equal amount of butanol at a temperature of about 80 to 110° F. to remove impurities and precipitate solid tris(hydroxymethyl)aminomethane, separating and dissolving the solid tris(hydroxymethyl)aminomethane in water, stripping the resulting solution of residual butanol and recycling the stripped solution to the evaporative crystallizer.

7. The process of claim 6 wherein the evaporative crystallizer is operated at a pressure of about 3 to 5 inches of Hg.

No references cited.

CHARLES B. PARKER, *Primary Examiner.*

R. L. RAYMOND, *Examiner.*